Oct. 15, 1946.   R. C. SANDERS, JR., ET AL   2,409,449
PHASE MODULATOR
Filed Dec. 30, 1943     2 Sheets—Sheet 1
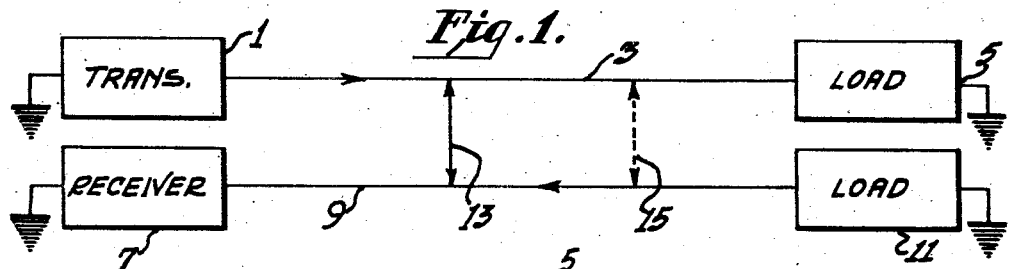
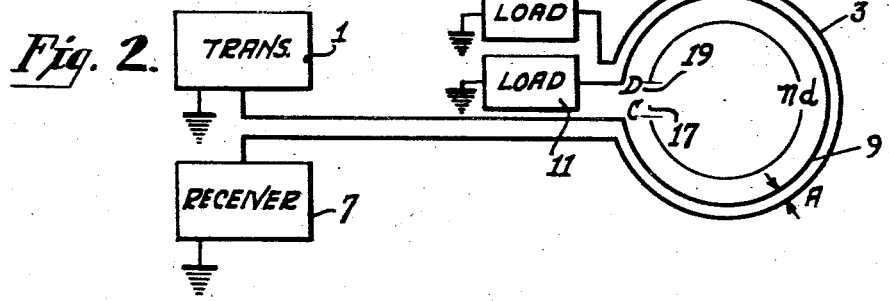
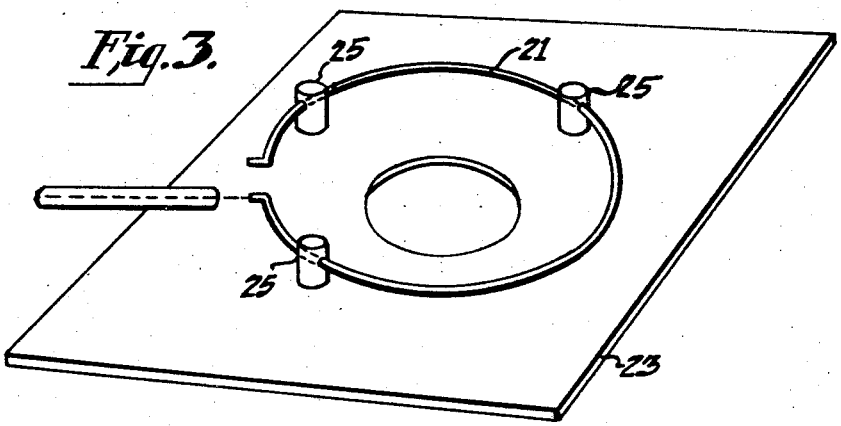
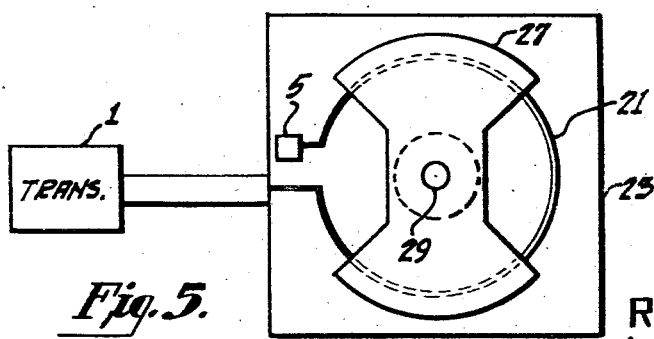
Inventors
ROYDEN C. SANDERS, JR.
WILLIAM R. MERCER
& DANIEL BLITZ
By C. D. Tucker  Attorney Oct. 15, 1946.    R. C. SANDERS, JR., ET AL    2,409,449
PHASE MODULATOR
Filed Dec. 30, 1943    2 Sheets—Sheet 2

Inventors
ROYDEN C. SANDERS, JR.
WILLIAM R. MERCER
DANIEL BLITZ
By CD Tuska
Attorney Patented Oct. 15, 1946

2,409,449

UNITED STATES PATENT OFFICE 2,409,449

PHASE MODULATOR

Royden C. Sanders, Jr., and William R. Mercer, Hightstown, and Daniel Blitz, Princeton, N. J., assignors to Radio Corporation of America, a corporation of Delaware Application December 30, 1943, Serial No. 516,254

7 Claims. (Cl. 178—44)

This invention relates to phase modulators, and more particularly to the art of changing continuously the phase of a radio frequency voltage at a predeterminable and adjustable rate.

The system described herein as a typical embodiment of the present invention is particularly adapted for the testing and calibration of radio reflection type speed measuring devices, wherein a radio signal is transmitted to a reflecting object or surface, reflected thereby and the reflected wave picked up by a receiver located near the transmitter, for comparison with the transmitted wave. Change in distance between the radio equipment and the reflecting object, by Doppler effect, causes a continuous shifting in phase of the reflected signal with respect to the transmitted signal, at a rate proportional to the rate of said motion. This effect may be simulated, in accordance with the instant invention, enabling the above mentioned testing and calibration to be done under laboratory conditions, with consequent advantages in improved accuracy and economy.

Phase modulator systems of the described type find application also in fields other than testing and calibration; for example, in frequency modulated radio reflection altimeter systems wherein phase modulation is superimposed on the frequency modulation to eliminate so-called "fixed error." An example of this type of altimeter is described in U. S. Patent No. 2,222,586 filed January 28, 1939, by R. C. Sanders, Jr., and entitled Radio altimeter.

The principal object of the instant invention is to provide an improved method of and means for producing continuous phase modulation of a radio frequency voltage.

Another object is to provide an improved method of and means for testing and calibrating radio reflection type speed measuring devices.

A further object is to provide an improved phase modulator structure of simple and rugged construction.

Figure 6:
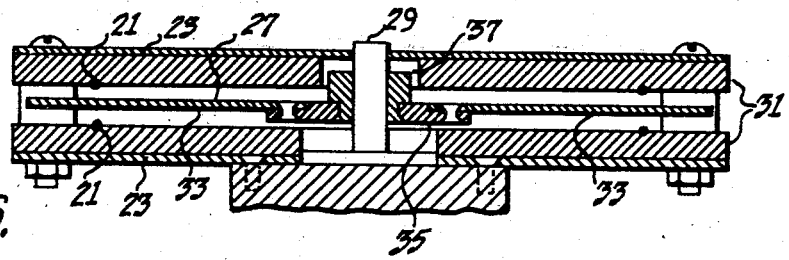
Figure 7:
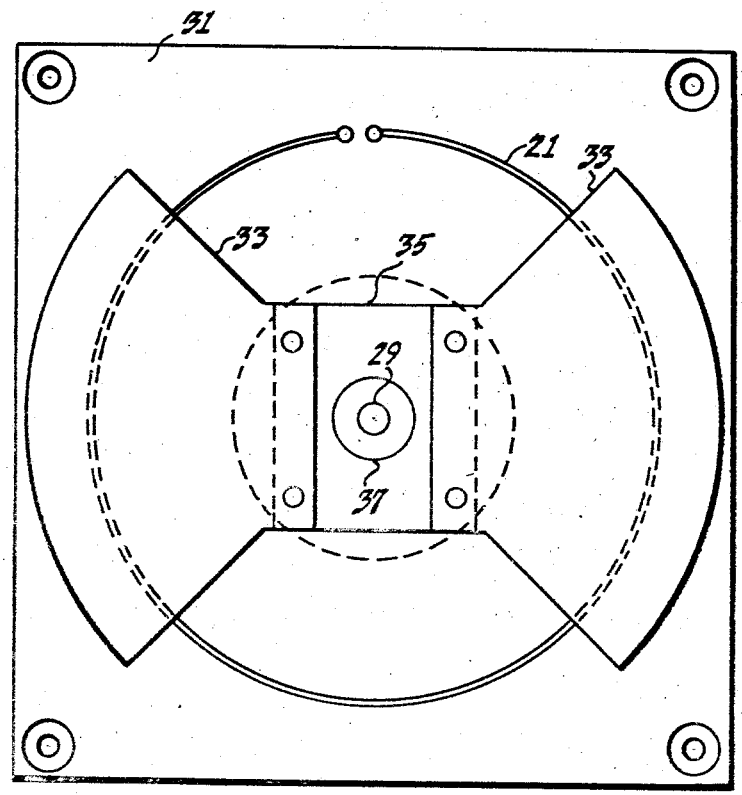
Figure 4:
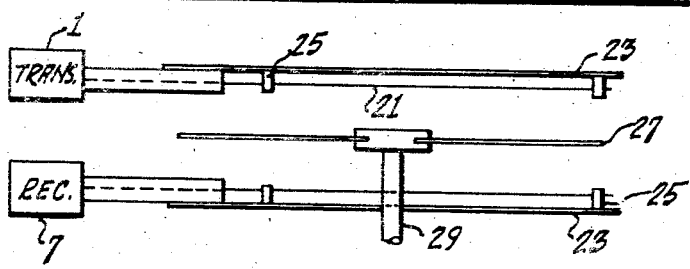

These and other objects will become apparent to those skilled in the art upon consideration of the following description, with reference to the accompanying drawings of which:

Figure 1 is a schematic diagram of a phase-shifter system illustrating the principles of operation of the present invention, Figure 2 is a schematic diagram of a modified arrangement of the system of Figure 1 to permit continuous and unlimited change of phase, Figure 3 is a perspective view of a portion of a phase modulator constructed in accordance with the arrangement of Figure 2, Figures 4 and 5 are elevation and plan views respectively of the structure of Figure 3, Figure 6 is a sectional elevation of a modified phase modulator structure, and Figure 7 is a plan view of the structure of Figure 6.

The present invention contemplates variation of the phase of a radio frequency voltage by varying the effective length of a transmission loop through which the R.-F. energy is conducted. By virtue of the time delay in transmission, the phase of the voltage leaving the loop is retarded with respect to that entering the loop by an amount depending upon the effective length.

Refer to Figure 1. A radio transmitter 1 is connected to a transmission line 3, which is terminated at its far end by a load 5. The load 5 is adjusted to match the impedance presented by the line 3, so that no standing waves are produced on the line by operation of the transmitter 1. Another line 9 is provided, parallel to and near the line 3, with a receiver 7 connected at the end near the transmitter 1. The line 9 is also provided with a matched load 11.

The two lines are coupled together at some point 13, so that a transmitted signal reaches the receiver 7 after travelling down the line 3 to the point of coupling 13 and back from there on the line 9. The phase of the signal reaching the receiver 7 can be varied by changing the position of the point of coupling to vary the effective distance between the transmitter 1 and the receiver 7.

Assume that the position of the point of coupling 13 is such as to make the signals at the transmitter 1 and the receiver 7 have a relative phase displacement of 360 degrees or some integral multiple of 360 degrees. The signals are then in phase and may be regarded as having zero phase difference. If the coupling is now moved to a point 15 located, for example, 45 electrical degrees further away from the transmitter 1 and the receiver 7 along the respective lines 3 and 9, the signal in going from the transmitter to the receiver must travel the original distance plus the added distance of 45 degrees on each line, which shifts the relative phase between the transmitter and the receiver by 90 degrees. Thus moving the coupling away from the transmitter and receiver retards the phase by double the electrical distance moved, and motion of the coupling in the other direction advances the phase at the receiver.

Any number of coupling points may be introduced simultaneously. If these points are spaced multiples of 180 degrees apart, they will add signal components at the receiver which are all in phase with each other. If the coupling of any point is broadened over a length of line to include, for example, everything between plus 45 degrees and minus 45 degrees from its center, the received signal will contain components of all phases between plus 90 degrees and minus 90 degrees. These components will add vectorially to produce a signal of the same phase as would result from coupling only at the mean point, but of much larger amplitude.

Referring to Figure 2, the parallel lines 3 and 9 are curved into a circle having a circumference an integral number of wavelengths long. The signal at the point 17 at the beginning of the circle is in phase with that at the point 19 at the end of the circle, and the point of coupling may be moved across the gap without discontinuity in phase of the received signal. If the point of coupling is revolved about the center of the circle so as to sweep along the lines 3 and 9 the signal phase at the receiver 7 is uniformly and continuously advanced or retarded by an angle:

$$\Delta\theta = 4\pi nT$$

where $\Delta\theta$ is the change in angle in radians, $n$ is the circumference of the circle in wavelengths, and $T$ is the number of turns made by the coupling point. If the coupling point is continuously moved in one direction at $s$ revolutions per second for a period of $t$ seconds, $$\Delta\theta = 4\pi nst$$

The instantaneous signal voltage at the receiver is proportional to $$\sin 2\pi f_r t = \sin(2\pi f_t t + \theta_t)$$

where $f_r$ is the received frequency, $f_t$ is the transmitted frequency, and $\theta_t$ is the total phase difference between the transmitter and the receiver. Assuming an initial angle $\alpha$ between the transmitter and receiver, $$\theta_t = \alpha + \Delta\theta$$
$$= \alpha + 4\pi nst$$
$$\sin 2\pi f_r t = \sin(2\pi f_t t + \alpha + 4\pi nst)$$
$$2\pi f_r t = 2\pi f_t t + \alpha + 4\pi nst$$
$$\frac{d}{dt}(2\pi f_r t) = \frac{d}{dt}(2\pi f_t t + \alpha + 4\pi nst)$$
$$2\pi f_r = 2\pi f_t + 4\pi ns$$
$$f_r = f_t + 2ns$$

In reflection type speed measuring systems, a reflecting object wth a velocity V relative to a source of signal of wavelength λ returns an echo signal differing in frequency from the transmitted signal by 2V/λ. The same difference in frequency may be obtained by revolving the coupling point of the system of Figure 2 at a speed $$s = V/\lambda n$$

Referring to Figure 3 each of the curved transmission lines may be an open wire 21 supported above a conductive ground plane 23 on standoff insulators 25. The two curved lines are placed with their planes parallel to each other with the open sides facing each other as shown in Figure 4. A conductive shield member 27 is supported between the two lines on a shaft 29 extending through the center of the lower ground plane 23. The shield member 27 (Figure 5) is shaped like a rotary shutter, with gaps 90 electrical degrees wide, spaced 180 electrical degrees apart. The shield 27 serves to prevent coupling between the parallel lines except at the gaps. The open wire lines 21 are each made an integral number of wavelengths long, so that the couplings at the two gaps are additive, as explained above in connection with Figure 1 of the drawings. In the structure illustrated in Figure 5, the lines are one wavelength long.

The spacing between the two open lines 21 is a compromise between the considerations of variations in characteristic impedance resulting from close proximity of the shutter blades to the lines, and incomplete coupling because of distance between the lines. Variations of line impedance cause reflections, which make the phase shift non-linear with respect to angle of shutter rotation and change the amplitude of the received signal with change in phase. Low coupling between the two lines results in high attenuation.

High shutter rotation speeds may be required under certain conditions, involving undesirably large centrifugal forces, with consequent vibration and bearing load problems. To avoid this difficulty, the diameter required for a given frequency of operation may be reduced by providing dielectric material between the lines and their ground planes, thus lowering the propagation velocity through the lines and hence reducing the wavelength.

Figures 6 and 7 show a structure of this type. Reference numerals in Figures 6 and 7 correspond to those used to designate corresponding parts of Figures 3, 4 and 5. The lines 21 are supported in circular grooves cut in the faces of boards 31 of insulating material such as "Bakelite" or the like, backed by the conducting surfaces 23. To prevent transmission of energy across the shutter member 27, the two blades 33 are insulated from each other by means of a "Bakelite" block 35 which is secured to the shaft 29 by a bushing 37. The open sections into which signal is introduced should be placed 90 electrical degrees apart to reduce the effect of any discontinuity caused by incorrect line length.

The invention has been described as a phase modulator system including two transmission lines disposed parallel to each other and shielded from each other except at certain coupling points. The lines are curved to circular formation and the coupling points are continuously swept over the lengths of the lines, by rotation of the shield. One end of each line is connected to the circuit in which the modulation is to be produced. Motion of the coupling points varies the effective length of line included in the circuit, causing corresponding variations in the transmission delay and hence phase modulation.

We claim as our invention:

1. A phase modulator system including two spaced parallel transmission lines, means for applying radio frequency energy to one end of one of said lines, means for absorbing radio frequency energy from the corresponding end of the other of said lines, movable shield means disposed between said lines, said shield means provided with at least one gap whereby coupling between said lines is prevented except at said gap, and motion of said shield means moves said coupling longitudinally with respect to said lines to vary the effective length of the transmission path between said means for applying energy and said means for absorbing energy.

2. The invention as set forth in claim 1 wherein said transmission lines are curved to substantially a circular outline an integral number of wavelengths in circumference at the frequency at which the system is to operate.

3. The invention as set forth in claim 1 wherein each of said lines is terminated in a load of such impedance as to match the impedance presented by said line.

4. The invention as set forth in claim 1 wherein said lines are curved to substantially circular outline and said shield means comprises a rotary shutter-like structure.

5. A phase modulator structure comprising two spaced parallel conductors curved to substantially circular form, a rotary shield member lying between said conductors and provided with at least one gap in its periphery, and two ground planes, each disposed adjacent to one of said conductors and on the opposite side thereof from said shield member.

6. The invention as set forth in claim 5, including two plates of insulating material, each lying between one of said conductors and the respective adjacent ground plane.

7. The invention as set forth in claim 5 wherein said shield member is in the form of a rotary shutter comprising at least two blades, and means for insulating said blades from each other.

ROYDEN C. SANDERS, JR.
WILLIAM R. MERCER.
DANIEL BLITZ.